SERVO SYSTEM FOR LIGHT LEVEL CONTROL

Filed Feb. 5, 1959 3 Sheets-Sheet 1

Inventors
George H. Fathauer
James E. Summers
by Hill, Sherman, Meroni, Gross & Simpson Attys.

SERVO SYSTEM FOR LIGHT LEVEL CONTROL

Filed Feb. 5, 1959 3 Sheets-Sheet 2

Inventors
George H. Fathauer
James E. Summers by Hill, Sherman, Meroni, Gross & Simpson Attys.

Oct. 30, 1962 G. H. FATHAUER ET AL 3,061,673

SERVO SYSTEM FOR LIGHT LEVEL CONTROL

Filed Feb. 5, 1959 3 Sheets-Sheet 3

Inventors
George H. Fathauer
James E. Summers by Hill, Sherman, Meroni, Gross & Simpson Attys.

United States Patent Office 3,061,673
Patented Oct. 30, 1962

3,061,673

SERVO SYSTEM FOR LIGHT LEVEL CONTROL

George H. Fathauer, Decatur, Ill., and James E. Summers, Michigan City, Ind., assignors to Thompson Ramo Wooldridge Inc., Cleveland, Ohio, a corporation of Ohio Filed Feb. 5, 1959, Ser. No. 791,403
10 Claims. (Cl. 178—7.2)

This invention relates to a servo system which is particularly designed for use in a television camera system.

The operation of a television camera is similar to that of a conventional film camera. When the intensity of an image is low, it is necessary to transmit the maxium amount of light to the screen of a television camera tube, or to the film of a conventional film camera, to obtain proper contrast in the reproduced image or the picture to be developed. On the other hand, when the image or scene has a high light intensity, it is necessary to reduce the amount of light transmitted to the camera tube screen, or to the film in a conventional film camera. The problem is more severe in connection with television cameras, in that excessive light intensities can not only cause improper reproduction, but can cause physical damage to the screen of the camera tube. This is particularly true in certain applications such as for example in missile tracking systems, in which an image of the sun may be impinged on the screen of the camera tube. In such systems, it is also necessary that the light transmission be rapidly controlled and it is, of course, desirable to have the highest possible degree of accuracy.

This invention was evolved with the object of providing a servo system for light level control, having fast and accurate response characteristics.

A further object of the invention is to provide a servo system which is rugged and reliable in operation and readily constructed from a minimum number of component parts.

According to this invention, an image is focused on the screen of the camera tube by means including variable light-transmission means for controlling the intensity of the image, and electro-mechanical means are provided for controlling the light-transmission means, preferably a two-phase induction motor.

Means are provided for scanning the camera tube screen at a certain rate to produce a video signal corresponding to the image, and it is desirable to use the video signal to control the operation of the variable light-transmission means. In accordance with this invention, the video signal is alternately applied to first and second detector circuits each arranged to start in an initial condition and develop an output signal which is a certain function of the amplitude of the video signal applied thereto, the output signal being preferably proportional to the peak amplitude of the video signal. During application of the video signal to the first detector circuit, the output signal from the second detector circuit is applied to the regulating means used for controlling the variable light-transmission means, and vice versa. With this arrangement, a high degree of accuracy is obtained in controlling the intensity of the image.

A feature of the invention is in the synchronization of the alternate application of the video signal to the detector circuits with the operation of the scanning means. Other features reside in specific circuit arrangements for accurately and reliably producing the proper signals for control of the light-transmission regulating means.

A further important feature of the invention is in a circuit arrangement for preventing continued application of excessive amounts of power to electro-mechanical means used to control the variable light-transmission means, while at the same time obtaining maximum speed response of the system.

This invention contemplates other objects, features and advantages which will become more fully apparent from the following detailed description taken in conjunction with the accompanying drawings which illustrate a preferred embodiment and in which.

Figure 1:
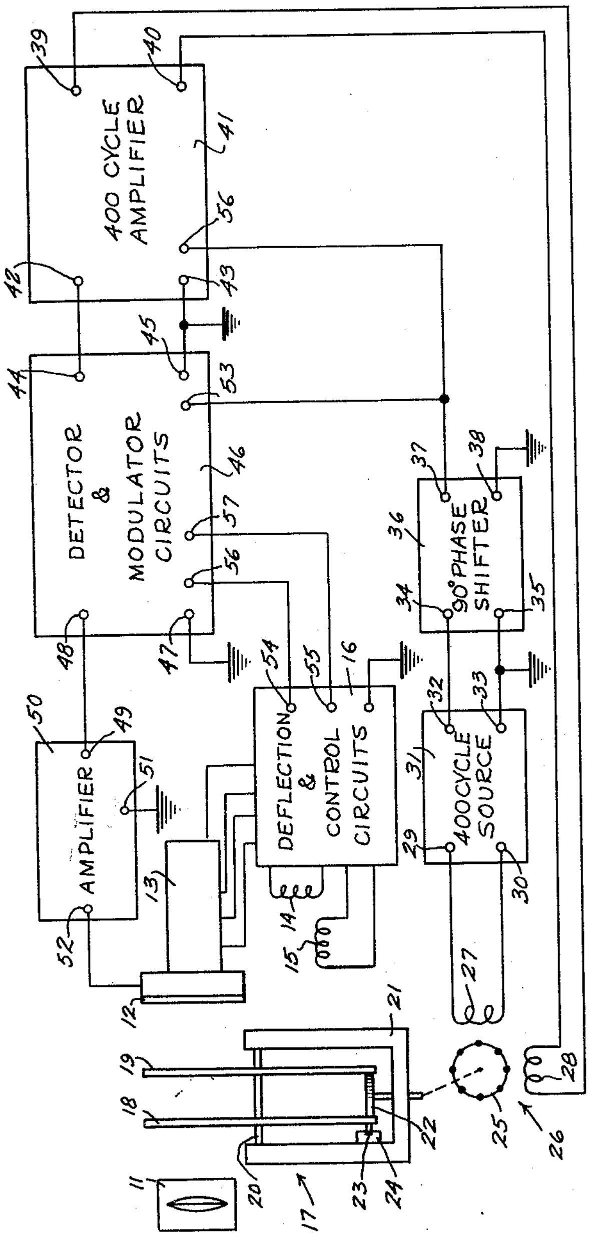
FIGURE 1 is a diagrammatic showing of a television system constructed according to the principles of this invention.

Reference numeral 10 generally designates a television system constructed according to the principles of this invention. In the system 10, a lens assembly 11 is used to focus an image upon the screen 12 of a television camera tube 13. The electrodes of the camera tube 13 and deflection coils 14 and 15 associated with the camera tube 13, are connected to deflection and control circuits 16, which may be of conventional form and are shown only in the block in FIGURE 1.

The means for focusing the image on the screen 12 includes variable light-transmission means generally indicated by reference numeral 17. As diagrammatically illustrated, such means comprise a pair of variable density disks 18 and 19 interposed between the lens assembly 11 and the screen 12 and journalled for rotation on a shaft 20 supported between arms of the generally U-shaped support 21. A drive disk 22 is engaged with opposed peripheral edge portions of the disks 18 and 19, to cause the disks 18 and 19 to rotate in opposite directions as the disk 22 is rotated. Rotation of the disks is limited by engagement of a pin 23 from the disk 18 with a stop 24 on the fixed frame 21. These disks 18 and 19 are so formed that their effective density and the attenuation of light therethrough, continuously increases as they are rotated in one direction through the permissble degree of rotation thereof. Through the use of two disks, instead of one, a more uniform overall transmission is achieved, with respect to the entire area of the screen 12. This general arrangement is old and does not, by itself, form a part of the present invention. Other forms of variable light-transmission means could be used.

The drive disk 22 is mechanically coupled to an armature 25 of a two-phase induction motor 26 having a pair of phase windings 27 and 28. Winding 27 is coupled to a pair of output terminals 29 and 30 of a 400 cycle alternating current source 31 having another pair of output terminals 32 and 33 connected to input terminals 34 and 35 of a 90° phase shifter 36, which has a pair of output terminals 37 and 38.

Winding 28 is connected to output terminals 39 and 40 of a 400 cycle amplifier 41 having input terminals 42 and 43 connected to output terminals 44 and 45 of detector and modulator circuits generally indicated by a block 46 in FIGURE 1. The circuits 46 have input terminals 47 and 48, terminal 47 being connected to ground, and terminal 48 being connected to an output terminal 49 of an amplifier 50 having a grounded terminal 51 and an input terminal 52 connected to the camera tube 13.

In the general operation of the circuit, suitable voltages and signals from the deflection and control circuits 16 are applied to the camera tube 13 to develop a cathode ray beam therein, and to cause the beam to scan the screen 12 in a predetermined regular pattern, and thereby develop a video signal corresponding to the image focused upon the screen 12. This video signal is amplified by amplifier 50 and applied to the detector and modulator circuits 46. A 400 cycle signal is applied from terminal 37 of the 90° phase shifter 36 to a terminal 53 of the detector and modulator circuits, and there is developed at the output terminals 44 and 45 a 400 cycle signal which corresponds in amplitude and phase to the deviation of the peak amplitude of the video signal from a certain value. This 400 cycle signal is amplified by amplifier 41 and applied to the winding 28, in 90° phase relation to the signal applied to winding 27, to cause the armature 25 to rotate in one direction or the other depending upon the phase of the signal.

If for example, the peak light intensity should increase, the signal applied to winding 28 will have a phase such as to cause rotation of the armature 25 in a direction to rotate disks 18 and 19 in a direction to reduce the transmission of light. A decrease in light intensity will, of course, have the reverse effect.

For reasons which will appear, it is desirable to apply signals from the deflection and control circuits 16 to the detector and modulator circuits 46, and, as shown in FIGURE 1, output terminals 54 and 55 of the deflection and control circuits 16 are connected to input terminals 56 and 57 of the detector and modulator circuits 46. It is also desirable to apply the 400 cycle signal directly to amplifier 41 such being provided by a connection between terminal 37 of the phase shifter 36 and a terminal 56 of the 400 cycle amplifier 41.

It should be noted that in addition to being applied to the light level control system, the video signal and signals from the deflection and control circuits may, of course, be transmitted to means used to reproduce the image focused upon the screen 12.

Figure 2:
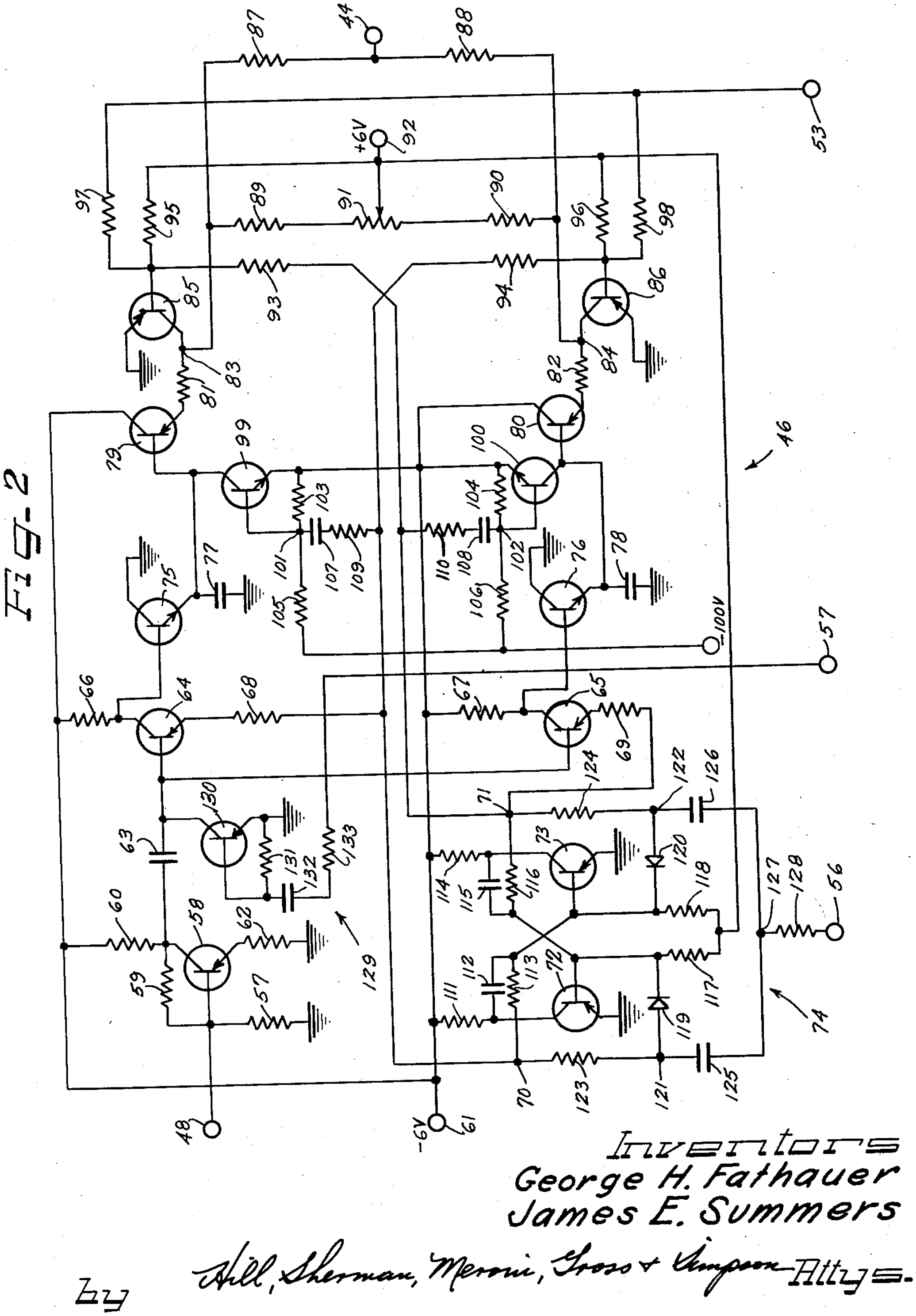
FIGURE 2 is a schematic electrical diagram of amplifier, detector and modulator circuits shown in block form in FIGURE 1.

FIGURE 2 is a schematic diagram of the detector and modulator circuits 46, illustrated in block form in FIGURE 1. Referring to FIGURE 2, the video input terminal 48 is connected through a resistor 57 to ground, to the base of a transistor 58 and through a resistor 59 to the collector of transistor 58. The collector is connected through a resistor 60 to a terminal 61 which may be connected to a battery or other source of voltage, six volts negative relative to ground. The transistor 58 has an emitter connected through a resistor 62 to ground. An amplified video signal produced at the collector of transistor 58 is applied through a capacitor 63 to the base electrodes of a pair of transistors 64 and 65 having collectors respectively connected through resistors 66 and 67 to the terminal 61, and having emitters respectively connected through resistors 68 and 69 to circuit points 70 and 71.

Circuit points 70 and 71 are respectively connected to collector electrodes of a pair of transistors 72 and 73 of a multivibrator circuit generally indicated by reference numeral 74. The multivibrator circuit 74 is described more in detail hereinafter, but it is here noted that the transistors 72 and 73 are alternately rendered conductive at a certain rate, preferably 25 cycles per second, to alternately place the potentials of terminals 70 and 71 at the ground potential. When circuit point 70 is placed at ground potential, the transistor 64 is rendered operative to apply the video signal from the collector thereof to the base of the transistor 75. When circuit point 71 is placed at ground potential, transistor 65 is rendered operative to apply the video signal from the collector thereof to the base of a transistor 76.

When the video signal is applied to the transistor 75, a capacitor 77 is charged to the peak value of the video signal, the capacitor 77 being connected between the emitter of transistor 75 and ground during the other half cycle of operation of multivibrator 74, when the video signal is applied to transistor 76, a capacitor 78 is charged to the peak value of the video signal, capacitor 78 being connected between ground and the emitter of transistor 76.

The junctions of capacitors 77 and 78 and the emitters of transistors 75 and 76 are respectively connected to base electrodes of a pair of transistors 79 and 80 having collectors connected to the negative six volt terminal 61 and having emitters connected through resistors 81 and 82 to circuit points 83 and 84. Circuit points 83 and 84 are respectively connected to the collector electrodes of a pair of transistors 85 and 86, through resistors 87 and 88 to output terminal 44, and through resistors 89 and 90 to end terminals of a modulator balance control potentiometer 91 having a movable contact connected to a terminal 92, which may be connected to a battery or other source of voltage at plus six volts relative to ground.

Transistors 85 and 86 have emitter electrodes connected to ground and base electrodes which are respectively connected through resistors 93 and 94 to the circuit points 71 and 70, through resistors 95 and 96 to the plus six volt terminal 92, and through resistors 97 and 98 to the 400 cycle input terminal 53. The 400 cycle signal applied to terminal 53 is preferably a square wave signal, produced in a manner described hereinafter in connection with FIGURE 4, shifting between ground potential and a negative six volt potential.

In the general operation of the circuit as thus far described, transistors 85 and 86 are alternately rendered operative by signals from the 25 cycle multivibrator 74, to act as modulators to develop 400 cycle signals at output terminal 44 corresponding in phase and amplitude to the condition of charge of capacitors 77 and 78. During operation of transistor 85 as a 400 cycle modulator, the charge of capacitor 78 is changed in accordance with the peak amplitude of the video signal, while during operation of transistor 86, the charge of capacitor 77 is changed in accordance with the peak amplitude of the video signal.

Before describing the detailed operation of the modulator circuits, it is noted that a pair of transistors 99 and 100 are provided for placing the capacitors 77 and 78 at an initial condition of charge prior to application of the video signal thereto. In particular, the collectors of transistors 99 and 100 are connected to capacitors 77 and 78, the emitters thereof are connected to the negative six volt terminal 61 and the base electrodes thereof are connected to circuit points 101 and 102. Circuit points 101 and 102 are connected through resistors 103 and 104 to the negative six volt terminal 61 and through resistors 105 and 106 to a terminal at a high negative potential, preferably on the order of 100 volts relative to ground. Circuit points 101 and 102 are further connected through capacitors 107 and 108 and series resistors 109 and 110 to circuit points 70 and 71, respectively. These circuits act as differentiating circuits to develop sharp triggering pulses to render the transistors 99 and 100 conductive for short time intervals, to restore capacitors 77 and 78 to initial conditions of charge. For example, when the potential of circuit point 70 shifts from negative six volts relative to ground to ground potential, a sharp positive pulse is applied to the base of transistor 99 to cause the transistor 99 to conduct and effectively connect capacitor 77 between ground and the negative six volt terminal 61. The capacitor 78 is similarly charged and responds to a shift in potential of circuit point 71 in a positive direction.

To explain more in detail the complete operation of the detector and modulator circuits 46, it may be assumed that the multivibrator 74 has just been operated to shift the potential of circuit point 70 in a positive direction from a negative six volt potential to ground potential. The transistor 99 then operates to charge the capacitor 77 and place the emitter of transistor 75 and the base of transistor 79 at a negative six volt potential.

At this time, also, the transistor 64 is rendered operative, the transistor 65 being inoperative. A positive-going video signal applied to the input terminal 48 causes the potential of the collector of transistor 58 and the potential of the base of transistor 64 to move in a negative direction. This will cause the potential of the collector of transistor 64 to move in a positive direction, to cause current flow through transistor 75 and discharge capacitor 77, thus to cause the potential of the emitter thereof to move from negative six volts toward ground potential. The potential of the emitter of transistor 75 will shift in a positive direction, in proportion to the peak value of the video signal.

At this time, the base of transistor 85 is maintained at a potential sufficiently negative with respect to ground to maintain conduction therethrough and maintain circuit point 83 at substantially ground potential. This is due to the fact that circuit point 71 is at a negative six volt potential, circuit point 71 being connected to the base of transistor 85 through the resistor 93. It may be noted that due to the application of the 400 cycle signal from terminal 53 through the resistor 97 to the base of transistor 85, the potential of the base of transistor 85 is shifted at the 400 cycle rate. For example, it may shift between negative 1.2 volts and negative 3.6 volts. However, it is always negative and hence the transistor 85 is maintained conductive.

Still assuming the circuit point 70 to be at ground potential as set forth above, the base of transistor 86 is shifted at the 400 cycle rate between a negative potential and a positive potential relative to ground. For example, the potential may shift between plus 1.2 volts and minus 1.2 volts relative to ground, these values being determined by the relative values of resistors 94, 96 and 98.

During each positive half cycle of the 400 cycle square wave signal applied from terminal 53 through resistor 98, the base of transistor 86 is positive and there is no current flow between the base and the collector thereof. Accordingly, during the positive half cycle, the circuit point 84 will have a potential determined by the state of charge of capacitor 78, the reference signal from potentiometer 91, and the relative values of resistors 82 and 90. This potential may be either positive or negative relative to ground potential.

During each negative half cycle of the 400 cycle square wave signal, the transistor 86 will conduct to place the potential of circuit point 84 substantially at ground potential. It should be noted that transistor 86 is of a type in which the collector can function as an emitter and in which the emitter can function as a collector. During the negative half cycle of the 400 cycle signal, current can flow from the collector to the base as well as from the emitter to the base to fix the potential of circuit point 84 substantially at ground potential, regardless of the state of charge of capacitor 78.

Accordingly, during each negative half cycle of the 400 cycle signal, the circuit point 84 is substantially at ground potential, while during each positive half cycle, the circuit point 84 has a potential determined by the state of charge of capacitor 78, which potential may be either positive or negative relative to ground. With this operation, a 400 cycle signal is produced at circuit point 84 having an amplitude and a phase or polarity dependent upon the deviation of the charge voltage of capacitor 78 from a certain reference value determined by the adjustment of potentiometer 91 and the relative values of resistors 82 and 90.

At this time, the circuit point 83 is substantially at ground potential and resistors 87 and 88 merely function as a voltage divider to produce a 400 cycle signal at output terminal 44 which is proportional to the signal at circuit point 84.

The above-described operation takes place when the circuit point 70 is at ground potential with the circuit point 71 being at a negative six volt potential. When the multivibrator 74 switches to place circuit point 70 at a negative six volt potential and to place circuit point 71 at substantially ground potential, a sharp pulse is applied to transistor 100 to restore capacitor 78 to its initial condition of charge. Capacitor 78 can then be charged in accordance with the peak value of the video signal applied through transistors 65 and 76. At this time, the transistor 85 functions as a modulator to produce a 400 cycle signal at circuit point 83 which is either in phase or out of phase with the signal applied at terminal 53 and which has an amplitude dependent upon the condition of charge of capacitor 77, as determined by the peak value of the video signal during the preceding one-half cycle of operation of multivibrator 74. The 400 cycle signal developed at circuit point 83 is, of course, developed at output terminal 44 through the voltage-divider action resistors 87 and 88, the potential circuit point 84 being fixed substantially at ground potential.

It may be noted that since transistors 75 and 76 allow conduction of current to the capacitors 77 and 78 only in one direction, the charge of capacitors 77 and 78 is changed in accordance with the peak value of the video signal, which is the preferred arrangement. It may be desired in some circumstances, however, to respond to another function of the video signal. For example, fixed resistances might be connected in series to the base electrodes of transistors 75 and 76 to respond to the integrated value of the video signal.

It should also be noted that the transistors 79 and 80, together with resistors 81 and 82 and associated circuitry, operate as emitter-follower circuits with large negative or inverse voltage feedback, so as to have high input impedances and low output impedances. This is highly desirable to prevent discharge of capacitors 77 and 78 and at the same time to allow proper operation of the modulator circuits.

With regard to the multivibrator circuit 74, the collector of transistor 72 is connected through a resistor 111 to the terminal 61 and also through the parallel combination of a capacitor 112 and a resistor 113 to the base of transistor 73. Similarly, the collector of transistor 73 is connected through a resistor 114 to the terminal 61 and through the parallel combination of a capacitor 115 and a resistor 116 to the base of transistor 72. The emitters of transistors 72 and 73 are connected to ground. The base electrodes of transistors 72 and 73 are connected through resistors 117 and 118 to the plus six volt terminal 92 and are also connected through diodes 119 and 120 to circuit points 121 and 122 which are connected through resistors 123 and 124 to the circuit points 70 and 71. Circuit points 121 and 122 are also connected through capacitors 125 and 126 to a circuit point 127 which is connected through a resistor 128 to the terminal 56.

In the operation of this circuit, conduction of current through one of the transistors 72, 73 will cause current through the other to be cut off, until a triggering pulse is applied from terminal 56, to cause a reversal of the conductive state of transistors 72 and 73. This general type of operation is, of course, well known and it is not believed to be necessary to describe the operation in detail.

It is a feature of the invention that the operation of multivibrator 74 is synchronized with the scanning of the picture tube screen. In the illustrated system, a conventional scanning system may be employed in which high frequency horizontal sweep signals are generated in the circuits 16 to cause the beam to periodically move from left to right across the screen to thereby trace horizontal lines. Vertical sweep signals of considerably lower frequency are simultaneously applied to periodically move the beams from top to bottom and thereby spread out the horizontal traces on the screens. The vertical sweep frequency may be on the order of 50 cycles per second, and pulses having a repetition rate of 50 per second may be applied from the terminal 54 of the deflection and control circuits 16 to the terminal 56, connected to the multivibrator circuit 74. Upon application of each such pulse, the multivibrator 74 is switched from one conductive state to the other, and hence the multivibrator 74 is operated at a rate of 25 cycles per second.

A clamping circuit generally designated by reference numeral 129 is preferably incorporated in the system. The purpose of this circuit is to restore the capacitor 63 to a certain initial condition of charge following the trace of each horizontal line, to restore low frequency components. This circuit comprises a transistor 130 having a collector connected to the junction of capacitor 63 and the base of transistor 64, and emitter connected to ground, and a base connected through a resistor 131 to ground and also through the series combination of a capacitor 132 and a resistor 133 to the terminal 57. In operation, a negative pulse developed by circuits 16 at the end of the trace of each horizontal line is applied through resistor 133 and capacitor 132 to the base of transistor 130 to cause transistor 130 to conduct and restore capacitor 63 to a certain initial condition of charge.

It should be noted that the system is not limited to use with any particular scanning system, but regardless of the type of scanning system, it is preferred to operate the multivibrator 74 in synchronism therewith.

Figure 3:
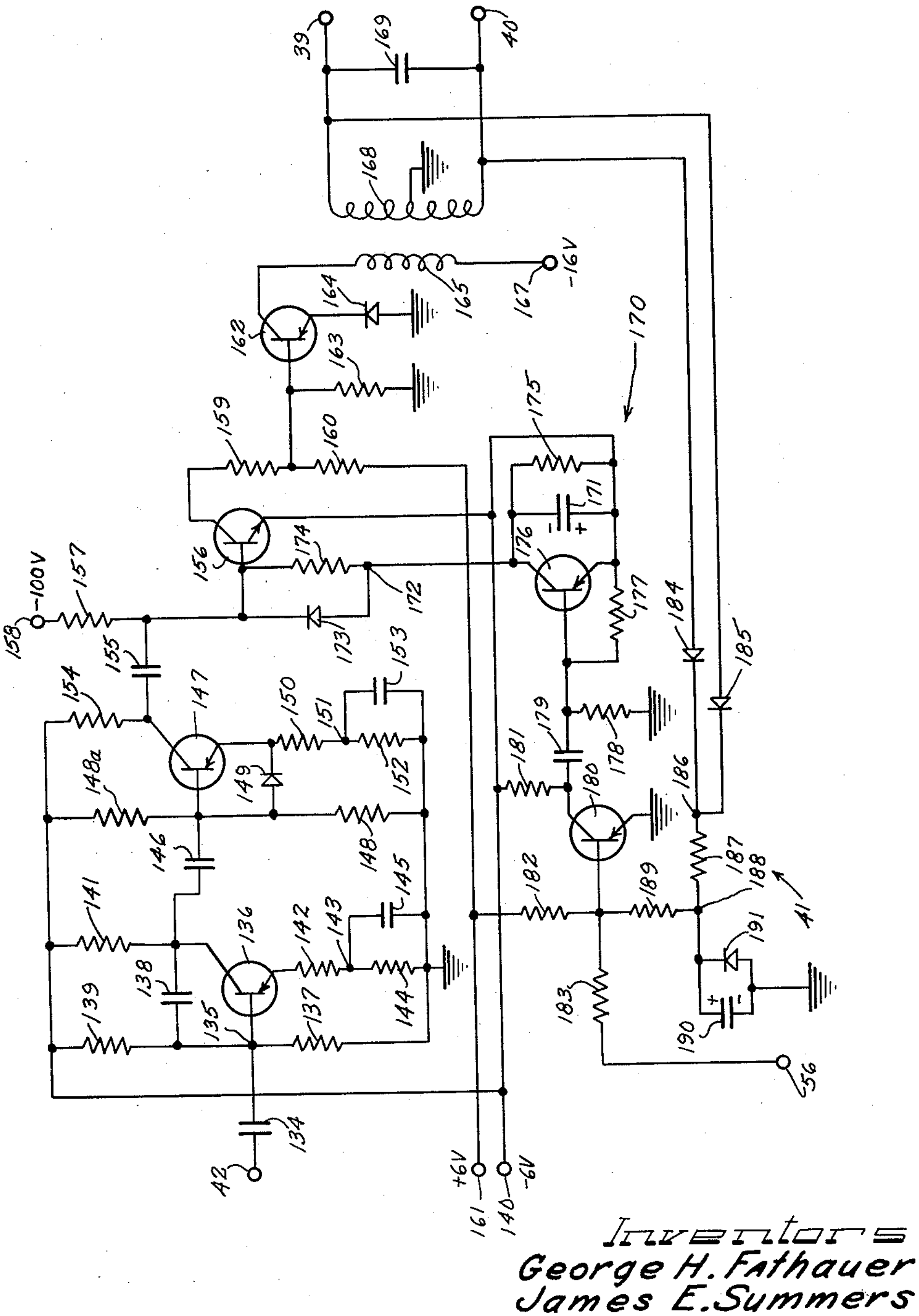
FIGURE 3 is a schematic electrical diagram of a 400 cycle amplifier shown in block form in FIGURE 1.

Referring now to FIGURE 3, the 400 cycle square wave signal developed at the output terminal 44 of the modulator is applied to input terminal 42 of the 400 cycle amplifier. Terminal 42 is connected through a capacitor 134 to a circuit point 135 which is connected to the base of a transistor 136, through a resistor 137 to ground, through a capacitor 138 to the collector of transistor 126 and through a resistor 139 to a negative six volt terminal 140. The collector of transistor 136 is connected through a resistor 141 to the terminal 140. The emitter of transistor 136 is connected through a transistor 142 to a circuit point 143 which is connected to ground through a parallel combination of a resistor 144 and a capacitor 145. This circuit functions as an amplifier circuit to develop an amplified 400 cycle signal at the collector of transistor 136.

This amplified 400 cycle signal is applied through a capacitor 146 to the base of a transistor 147 which is connected through a resistor 148 to ground, through a resistor **148*a* to terminal 140, and also through a diode 149 to the emitter of transistor 147, the emitter being connected through a resistor 150 to a circuit point 151, connected to ground through the parallel combination of a resistor 152 and a capacitor 153. The collector of transistor 147 is connected through resistor 154 to the terminal 140. This provides a further amplifier stage, producing a higher amplitude 400 cycle signal at the collector of transistor 147**.

The amplified signal developed at the collector of transistor 147 is applied through a capacitor 155 to the base electrode of another amplifier transistor 156. The base electrode of transistor 156 is connected through a resistor 157 to a terminal 158 which is connected to a source of relatively high negative potential, with respect to ground, preferably minus 100 volts. The base of transistor 156 is also connected to a special control circuit which is described in detail hereinafter.

The emitter of transistor 156 is connected to the terminal 140, while the collector thereof is connected through series resistors 159 and 160 to a positive six volt supply terminal 161.

A further amplified 400 cycle signal is developed at the junction between resistors 159 and 160 which is applied directly to the base of a power transistor 162, the base thereof being connected through a resistor 163 to ground. The emitter of power transistor 162 is connected through a diode 164 to ground. The diode 164 provides relatively high alternating current impedances and a low direct current impedance. The collector of power transistor 162 is connected through a primary winding 165 of a transformer 166 to a terminal 167 which may be connected to a negative supply voltage source, preferably on the order of minus 16 volts. The transformer 166 has a secondary winding 168 having a center tap connected to ground and having end terminals connected to the output terminals 39 and 40. A capacitor 169 is connected across the secondary 168 to define therewith a series circuit resonant at 400 cycles.

With the circuit as thus far described, any 400 cycle error signal developed by the detector and modulator circuits 46 is applied to the terminal 42 and is amplified through the operation of transistors 136, 147, 156 and 162 to develop a relatively high power output at terminals 39 and 40, which is applied to winding 28 of the two phase reversible induction motor 46. This, of course, causes the motor armature 25 to rotate in one direction or the other and either increase or decrease the amount of light transmitted to the camera tube screen.

As indicated above, the amount of movement of the disks 18 and 19 may be limited, as by engagement of the pin 23 with the fixed stop 24, and the motor 26 is then, of course, stalled against further rotation. Under such conditions, however, it often times happens that there will still be developed an error signal of a direction to indicate further rotation of the motor. If the amplifier 41 has a large power output, such may cause the motor 26 to be burned up. On the other hand, if the amplifier 41 has only a small maximum power output, it may not cause damage to the motor but in that event, the power output may not be sufficient to achieve the desired speed of response of the system.

According to this invention, a special circuit arrangement is provided to permit application of high power to the motor 26 and at the same time to prevent damage thereto under stalled conditions.

In accordance with this feature, control means are provided responsive to continued application of an input signal of either polarity to the amplifier for reducing the effective amplification factor thereof and preventing continued application of high power to the motor after reaching the limit of travel thereof in either direction.

This control means is generally indicated by reference numeral 170 and comprises a capacitor 171 connected between the negative six volt terminal 140 and a circuit point 172 which is connected to the base of transistor 156 through the parallel combination of a diode 173 and a resistor 174.

It is assumed that the capacitor 171 is initially uncharged, the circuit point 172 will be at a minus six volt potential, and a certain relatively high amplification will be achieved in the amplifier stage including transistor 156. However, when an amplified 400 cycle signal is developed at the collector of transistor 147, the diode 173 conducts during the negative swings of the 400 cycle signal and the capacitor 171 is charged up with a polarity as indicated to apply a negative bias in the base circuit of transistor 156. This will, of course, reduce the amplification of the amplifier and reduce the output thereof. The amount of reduction in amplifier factor is determined by the value of a resistor 175 connected across the capacitor 171.

When the motor is at one limit or the other of travel thereof, this reduction of effective amplification factor is, of course, desirable to prevent damage to the motor. However, under normal conditions of operation with the motor at a position intermediate the limits of travel thereof, it is desirable to have a maximum power output of the amplifier available for achieving maximum speed of response.

In the control circuit 170 of this invention, means are provided for effectively short-circuiting the capacitor 171 during normal conditions of operation. In particular, a transistor 176 is provided having a collector connected to the circuit point 172 and having an emitter connected to the terminal 140. The base of transistor 176 is connected through a resistor 177 to the emitter thereof, through a resistor 178 to ground and through a capacitor 179 to the collector of a transistor 180. The collector of transistor 180 is connected through a resistor 181 to the terminal 140, the emitter thereof is connected to ground and the base thereof is connected through a resistor 182 to the plus six volt terminal 161 and through a resistor 183 to the terminal 56.

In the operation of this circuit as thus far described, a 400 cycle signal is applied to terminal 56 from the phase shifter 36. This signal is effectively amplified by the transistor 180 and is applied to the base of transistor 176 to cause conduction of the transistor 176 during each cycle of the 400 cycle signal, to thereby short-circuit the capacitor 171. Accordingly, no substantial amount of charge can be accumulated by the capacitor 171 and under normal condition, the amplifier operates with its maximum amplification factor and maximum power output.

When the variable light-transmission means is moved to the limit of its travel in either direction, a continued error signal may be applied to the amplifier and as suggested above, it is desirable under such conditions to allow the capacitor 171 to become charged up to limit the power output. This operation is achieved with the control circuit 170. In particular, a pair of rectifiers 184 and 185 are connected between output terminals 39 and 40 and a circuit point 186 connected through a resistor 187 to a circuit point 188 which is connected through a resistor 189 to the base of transistor 180 and is also connected to ground through the parallel combination of a capacitor 190 and a diode 191.

In operation, when an output signal is developed between terminals 39 and 40, it is rectified by rectifiers 184 and 185 and through the resistor 187 built up a charge across the capacitor 190 with a polarity as indicated. A positive voltage is thus applied to the base of transistor 180 through the resistor 189 and if the amplifier output is above a certain value, the transistor 180 will be biased beyond cutoff to prevent application of the 400 cycle signal to the transistor 176. The capacitor 171 can then become charged up through the diode 173, to apply a negative bias to the transistor 156 and reduce the amplification factor of the amplifier and the output thereof. Accordingly, in response to the continued input signal, the amplification factor of the amplifier is automatically reduced, and the power output thereof is reduced to prevent damage to the motor 26.

It should be noted that the diode 191 is preferably a Zener diode which limits the voltage developed across capacitor 190 and also provides a discharge path for capacitor 190.

An important feature of the operation of the circuit 170 is that the capacitor 171 can be rapidly discharged when the error signal is reduced to zero and then shifted to the opposite polarity, to then permit full amplifier output and rapid response. In particular, when the output of the amplifier is reduced to substantially zero, the capacitor 190 may be discharged in a comparatively short length of time, to permit application of the 400 cycle signal from terminal 56 through transistor 180 to the transistor 176 and thus permit rapid discharge of the capacitor 171.

Figure 4:
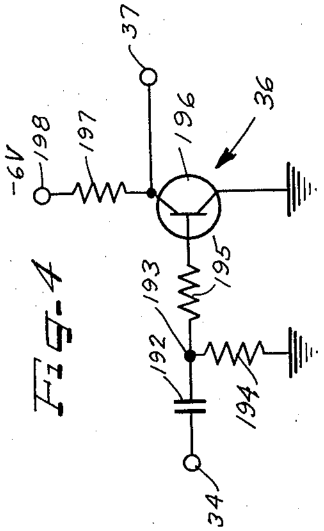
FIGURE 4 is a schematic electrical diagram of a 90° phase shifter circuit shown in block form in FIGURE 1.

FIGURE 4 illustrates a preferred form of circuit for the phase shifter 36. Referring thereto, input terminal 34 is connected through a capacitor 192 to a circuit point 193 connected through a resistor 194 to ground. Circuit point 193 is connected through a resistor 195 to the base of a transistor 196 having an emitter connected to ground and a collector connected through a resistor 197 to a terminal 198 connected to a negative six volt supply.

Capacitor 192 and resistor 194 operate as a 90° phase shifter to develop a signal at circuit point 193 approximately 90° out of phase with the signal applied to input terminal 34. During the negative swings of this signal at circuit point 193, the transistor 196 conducts to shift the potential of collector of transistor 196 from a negative six volts to approximately ground potential, at the 400 cycle rate. This signal is applied to the output terminal 37 and from terminal 37 to the terminal 53 of the detector and modulator circuits as well as the terminal 56 of the 400 cycle amplifier.

This invention thus provides a servo system in which sensitivity is controlled in response to a certain function of the amplitude of input energy applied thereto and preferably the peak amplitude occurring during certain sampling time intervals. This system could conceivably be used with systems other than television camera systems, but is particularly advantageous in such systems in obtaining proper contrast and protecting the camera tube against damage. It also has the advantage that the sampling time intervals can coincide with the scanning of the screen.

This invention also provides a circuit arrangement for preventing continued application of excessive amounts of power to electro-mechanical position-control means. This arrangement could be used in many other types of servo systems but is particularly advantageous in the television camera system as disclosed in obtaining maximum speed of response.

By way of illustrative example, and not by way of limitation, the resistors and capacitors of the circuits may preferably have values as follows:

| Reference numeral: | | Value |
|---|---|---|
| 57 | ohms | 4700 |
| 59 | do | 22,000 |
| 60 | do | 1000 |
| 62 | do | 50 |
| 63 | microfarads | 0.01 |
| 66 | ohms | 1000 |
| 67 | do | 1000 |
| 68 | do | 470 |
| 69 | do | 470 |
| 77 | microfarads | 0.47 |
| 78 | do | 0.47 |
| 81 | ohms | 190 |
| 82 | do | 190 |
| 87 | do | 10,000 |
| 88 | do | 10,000 |
| 89 | do | 22,000 |
| 90 | do | 22,000 |
| 93 | do | 10,000 |
| 94 | do | 10,000 |
| 95 | do | 22,000 |
| 96 | do | 22,000 |
| 97 | do | 10,000 |
| 98 | do | 10,000 |
| 103 | do | 10,000 |
| 104 | do | 10,000 |
| 105 | do | 680,000 |
| 106 | do | 680,000 |
| 107 | microfarads | 0.01 |
| 108 | do | 0.01 |
| 109 | ohms | 5600 |
| 110 | do | 5600 |
| 111 | do | 1000 |
| 112 | micro-microfarads | 820 |
| 113 | ohms | 6800 |
| 114 | do | 1000 |
| 115 | micro-microfarads | 820 |
| 116 | ohms | 6800 |
| 117 | do | 15,000 |
| 118 | do | 15,000 |
| 123 | do | 15,000 |
| 124 | do | 15,000 |
| 125 | micro-microfarads | 820 |
| 126 | do | 820 |
| 128 | ohms | 1000 |

| Reference numeral: | | Value |
|---|---|---|
| 131 | ohms | 47,000 |
| 133 | do | 2200 |
| 134 | microfarads | 47 |
| 137 | ohms | 4700 |
| 138 | micro-microfarads | 820 |
| 139 | ohms | 18,000 |
| 141 | do | 3300 |
| 142 | do | 47 |
| 144 | do | 1000 |
| 145 | microfarads | 47 |
| 146 | do | 47 |
| 148 | ohms | 4700 |
| 150 | do | 47 |
| 152 | do | 1000 |
| 153 | microfarads | 47 |
| 154 | ohms | 3300 |
| 155 | microfarads | 47 |
| 157 | ohms | 470,000 |
| 159 | do | 120 |
| 160 | do | 1200 |
| 163 | do | 560 |
| 169 | microfarads | 4 |
| 171 | do | 60 |
| 174 | ohms | 2700 |
| 175 | do | 6800 |
| 177 | do | 10,000 |
| 178 | do | 68,000 |
| 179 | microfarads | 4 |
| 181 | ohms | 1000 |
| 182 | do | 33,000 |
| 183 | do | 10,000 |
| 187 | do | 1000 |
| 189 | do | 10,000 |
| 190 | microfarads | 0.5 |
| 192 | do | 0.1 |
| 194 | ohms | 470 |
| 195 | do | 1000 |
| 197 | do | 1000 |

The transistors and diodes may preferably be of the following types:

| Reference numeral: | Type |
|---|---|
| 58 | 2N316 |
| 64 | 2N316 |
| 65 | 2N316 |
| 72 | 2N316 |
| 73 | 2N316 |
| 75 | 2N358 |
| 76 | 2N358 |
| 79 | 2N393 |
| 80 | 2N393 |
| 85 | 2N344 |
| 86 | 2N358 |
| 99 | 2N358 |
| 100 | 1N128 |
| 119 | 1N128 |
| 120 | 2N344 |
| 130 | 2N393 |
| 136 | 2N393 |
| 147 | 1N128 |
| 149 | 2N358 |
| 156 | 2N301A |
| 162 | 1N538 |
| 164 | 1N128 |
| 173 | 2N316 |
| 176 | 2N316 |
| 180 | 1N482 |
| 184 | 1N482 |
| 185 | 650C0 |
| 191 | 2N316 |
| 196 | 2N316 |

It will be understood that modifications and variations may be effected without departing from the spirit and scope of the novel concepts of this invention.

We claim as our invention:

1. In a television system including a camera tube having a screen, means for focusing an image on said screen including variable light-transmission means for controlling the intensity of the image, and means for scanning said screen at a certain rate to produce a video signal corresponding to the image, regulating means for controlling said variable light-transmission means, first and second detector circuits each arranged to start in an initial condition and develop an output signal which is a certain function of the amplitude of an input signal applied thereto, control means for alternately applying said video signal to said detector circuits, and means for applying only the output signal from said first detector circuit to said regulating means during application of said video signal to said second detector circuit and vice versa, to control the intensity of the image in accordance with a certain function of the video signal amplitude.

2. In a television system including a camera tube having a screen, means for focusing an image on said screen including variable light-transmission means for controlling the intensity of the image, and means for scanning said screen at a certain rate to produce a video signal corresponding to the image, regulating means for controlling said variable light-transmission means, first and second detector circuits each arranged to start in an initial condition and develop an output signal which is a certain function of the amplitude of an input signal applied thereto, control means for alternately applying said video signal to said detector circuits, means for applying the output signal from said first detector circuit to said regulating means during application of said video signal to said second detector circuit and vice versa, to control the intensity of the image in accordance with a certain function of the video signal amplitude, and means for restoring each detector circuit to said initial condition prior to application of said video signal thereto.

3. In a television system including a camera tube having a screen, means for focusing an image on said screen including variable light-transmission means for controlling the intensity of the image, and means for scanning said screen at a certain rate to produce a video signal corresponding to the image, regulating means for controlling said variable light-transmission means, first and second detector circuits each arranged to start in an initial condition and develop an output signal which is a certain function of the amplitude of an input signal applied thereto, control means for alternately applying said video signal to said detector circuits, means for applying the output signal from said first detector circuit to said regulating means during application of said video signal to said second detector circuit and vice versa, to control the intensity of the image in accordance with a certain function of the video signal amplitude, and means synchronizing the operation of said control means with the operation of said scanning means.

4. In a television system including a camera tube having a screen, means for focusing an image on said screen including variable light-transmission means for controlling the intensity of the image, and means for scanning said screen at a certain rate to produce a video signal corresponding to the image, regulating means for controlling said variable light-transmission means, first and second capacitors, control means for alternately applying said video signal to said capacitors to develop voltages thereacross each voltage being a certain function of the amplitude of the video signal, means utilizing the voltage developed across said first capacitor to control said regulating means during application of said video signal to said second capacitor and vice versa, and means for restoring each capacitor to an initial condition of charge prior to application of said video signal thereto.

5. In a television system including a camera tube having a screen, means for focusing an image on said screen including variable light-transmission means for controlling the intensity of the image, and means for scanning said screen at a certain rate to produce a video signal corresponding to the image, regulating means for controlling said variable light-transmission means, first and second capacitors, control means for alternately applying said video signal to said capacitors to develop voltages thereacross each voltage being a certain function of the amplitude of the video signal, means utilizing the voltage developed across said first capacitor to control said regulating means during application of said video signal to said second capacitor and vice versa, means for restoring each capacitor to an initial condition of charge prior to application of said video signal thereto, said control means comprising a pair of devices for applying said video signal to said capacitors, each device being arranged to conduct current only in one direction whereby the voltage developed across each capacitor is proportional to the peak amplitude of the video signal.

6. In a television system including a camera tube having a screen, means for focusing an image on said screen including variable light-transmission means for controlling the intensity of the image, and means for scanning said screen at a certain rate to produce a video signal corresponding to the image, regulating means for controlling said variable light-transmission means, first and second capacitors, control means for alternately applying said video signal to said capacitors to develop voltages thereacross each voltage being a certain function of the amplitude of the video signal, first and second power amplifiers having inputs respectfully connected to said first and second capacitors and having inverse voltage feedback to provide high input and low output impedances, and means utilizing the voltage developed across the output of said first amplifier to control said regulating means during application of said video signals to said second capacitor and vice versa.

7. In a television system including a camera tube having a screen, means for focusing an image on said screen including variable light-transmission means for controlling the intensity of the image, and means for scanning said screen at a certain rate to produce a video signal corresponding to the image, a two-phase induction motor mechanically coupled to said variable light-transmission means and having a pair of windings, a source of alternating current, modulator means between said source and one of said windings, means for applying alternating current to the other of said windings in 90° phase relation to the current applied to said one of said windings, first and second detector circuits each arranged to start in an initial condition and develop an output signal, which is a certain function of the amplitude of an input signal applied thereto, control means for alternately applying said video signal to said detector circuits, and means for applying the output signal from said first detector circuit to said modulator means during application of said video signal to said second detector circuit and vice versa.

8. In a television system including a camera tube having a screen, means for focusing an image on said screen including variable light-transmission means for controlling the intensity of the image, and means for scanning said screen at a certain rate to produce a video signal corresponding to the image, regulating means for controlling said variable light-transmission means, first and second detector circuits each arranged to start in an initial condition and develop an output signal which is a certain function of the amplitude of an input signal applied thereto, a multivibrator arranged to periodically shift from one electrical condition to another and back again, means controlled by said multivibrator for alternately applying said video signal to said detector circuits, and means controlled by said multivibrator for applying the output signal from said first detector circuit to said regulating means during application of said video signal to said second detector circuit and vice versa.

9. In a television system including a camera tube having a screen, means for focusing an image on said screen including variable light-transmission means for controlling the intensity of the image, and means for scanning said screen at a certain rate to produce a video signal corresponding to the image, regulating means for controlling said variable light-transmission means, first and second detector circuits each arranged to start in an initial condition and develop an output signal which is a certain function of the amplitude of an input signal applied thereto, a multivibrator arranged to periodically shift from one electrical condition to another and back again, means controlled by said multivibrator for alternately applying said video signal to said detector circuits, means controlled by said multivibrator for applying the output signal from said first detector circuit to said regulating means during application of said video signal to said second detector circuit and vice versa, and means controlled by said multivibrator for restoring each detector circuit to said initial condition prior to application of said video signal thereto.

10. In a television system including a camera tube having a screen, means for focusing an image on said screen including variable light-transmission means for controlling the intensity of the image, and means for scanning said screen at a certain rate to produce a video signal corresponding to the image, regulating means for controlling said variable light-transmission means, first and second detector circuits each arranged to start in an initial condition and develop an output signal which is a certain function of the amplitude of an input signal applied thereto, a multivibrator arranged to periodically shift from one electrical condition to another and back again, means controlled by said multivibrator for alternately applying said video signal to said detector circuits, means controlled by said multivibrator for applying the output signal from said first detector circuit to said regulating means during application of said video signal to said second detector circuit and vice versa, and means for applying a control signal from said scanning means to said multivibrator to operate said multivibrator in synchronism with said scanning means.

References Cited in the file of this patent

UNITED STATES PATENTS

| | | |
|---|---|---|
| 2,403,628 | Beers | July 9, 1946 |
| 2,431,824 | Poch | Dec. 2, 1947 |
| 2,861,232 | Willems | Nov. 18, 1958 |
| 2,863,107 | Blauvelt | Dec. 2, 1958 |
| 2,875,276 | Donnay | Feb. 24, 1959 |
| 2,898,536 | Musolf | Aug. 4, 1959 |